UNITED STATES PATENT OFFICE.

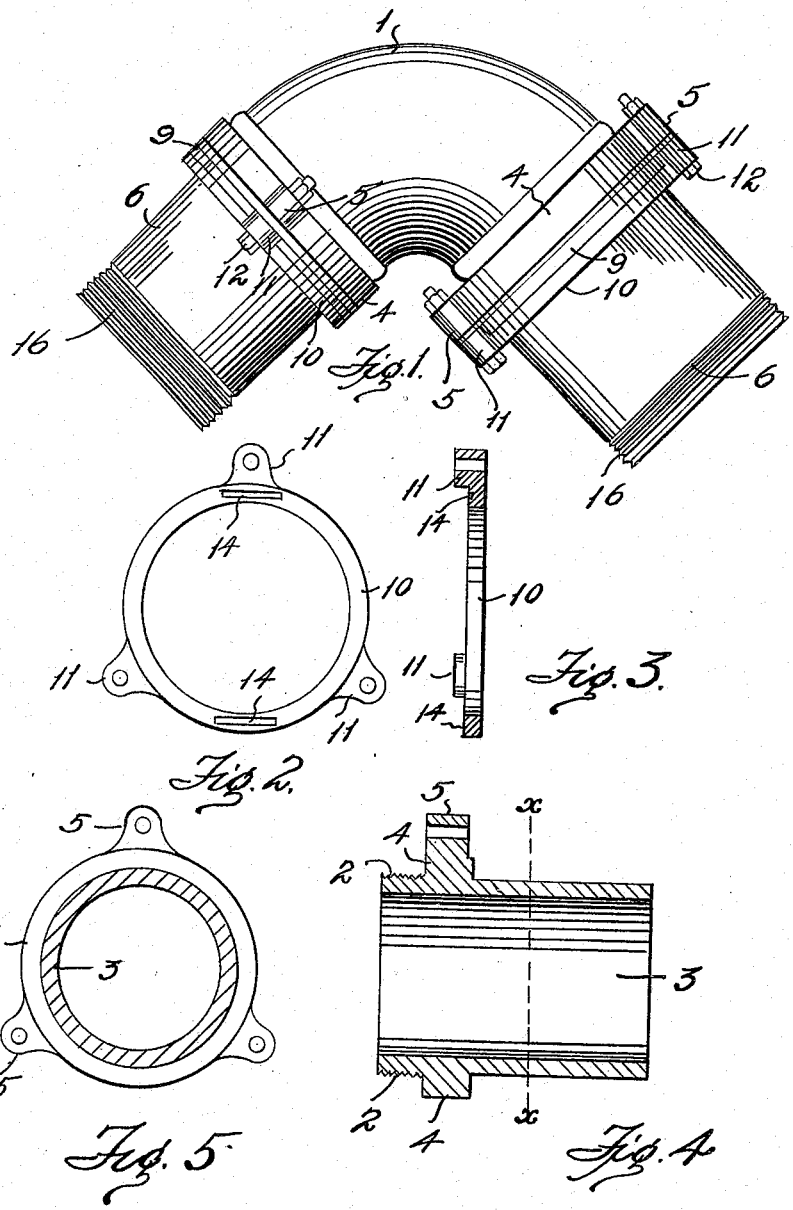

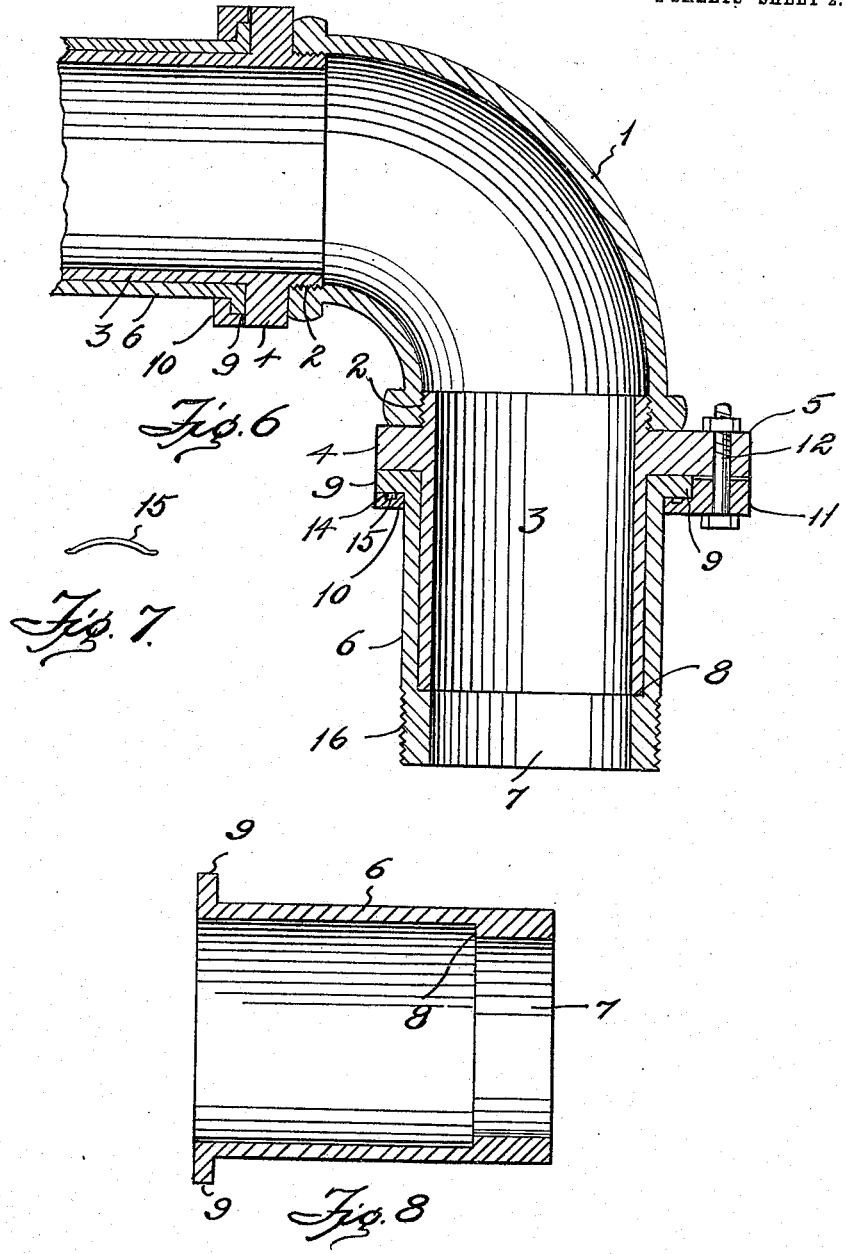

GEORGE GUILD, OF HOUSTON, TEXAS.

SWIVEL CONNECTION.

937,301.  Specification of Letters Patent.  Patented Oct. 19, 1909.

Application filed March 21, 1908. Serial No. 422,472.

*To all whom it may concern:*

Be it known that I, GEORGE GUILD, citizen of the United States, residing at Houston, in the county of Harris and State of Texas, have invented certain new and useful Improvements in Swivel Connections, of which the following is a specification.

My invention relates to new and useful improvements in swivel connections and more particularly to a swivel connection for pipe joints.

The object of the invention is to provide a swivel connection whereby one pipe may be turned independently of the other and to carry out this construction in a simple manner.

A further object of the invention is to obviate the use of packing, thereby greatly simplifying the arrangement and the construction of the parts and facilitating the assembling of the connection.

Finally the object of the invention is to provide a device of the character described that will be strong, durable, efficient and comparatively inexpensive to construct, also one in which the several parts will not be liable to get out of working order.

With the above and other objects in view, the invention has relation to certain novel features of construction and operation, an example of which is described in the following specification and illustrated in the accompanying drawings, wherein:

Figure 1 is a side elevation showing my invention applied to an elbow connection, Fig. 2 is a plan view of the swivel ring, Fig. 3 is a vertical section of the swivel ring, Fig. 4 is a longitudinal section of the pipe section, Fig. 5 is a section on the line $x$—$x$ of Fig. 4, showing parts in elevation, Fig. 6 is a longitudinal sectional view showing my invention in connection with an elbow joint, Fig. 7 is a detail of one of the springs, and Fig. 8 is a longitudinal section of the sleeve.

In the drawings the numeral 1 designates an elbow, internally screw-threaded to receive the screw-threaded end 2 of a pipe section 3. The said pipe section is properly turned and ground to form the proper joints with the parts with which it engages. Near its threaded end 2, it is provided with an annular flange 4 which bears against the elbow and is provided with a plurality of bolt receiving lugs 5. A sleeve 6 slightly longer than the projecting portion of the pipe section is provided at one end with an internal annular flange 7 provided with a ground shoulder 8 against which the end of the pipe section bears when the sleeve is placed over the said section as shown in Fig. 6. At its opposite end, the sleeve 6 is provided with an outwardly directed annular flange 9 having its outer surface flush with the end of the sleeve and bearing against the flange 4 of the pipe section.

A swivel ring 10 is arranged to fit snugly over the sleeve 6 and provided with bolt receiving lugs 11 projecting beyond one side thereof and between which, the flange 9 is received as shown in Figs. 1 and 6. Bolts 12 are passed through the lugs 5 and 11, the same having been previously registered. The lugs 11 are of such length as to be drawn firmly against the lugs 5 to hold the sleeve 6 on the pipe section 3, but without binding, so that the said sleeve is free to turn, the ring 10 forming a bearing for the flange 9 as will be apparent.

By reason of the ground joints and finished surfaces, the sleeve is free to turn and the liability of leakage reduced to a minimum. However should it be found desirable packing may be inserted between the flange 9 and the end of the sleeve 6 on one side and the flange 4 on the other. This however would not be necessary except probably where the fluid passing through the pipes is placed under an extremely high pressure.

In order to effect a closer contact between the shoulder 8 and the end of the pipe section 3, and the flanges 4 and 9, the swivel ring 10 is provided with recesses 14 in which flat springs 15 are arranged so as to bear against the flange 9 as will be apparent. The outer end of the sleeve 6 is screw-threaded so as to be connected through the pipe or conduit with which the connection is used.

While I have only described the connection at one end of the elbow it is evident that it may be applied at both ends and that the internal diameter of the pipe section 3 may be decreased to permit the elbow to be connected with pipes of smaller diameters. The sleeve 6, as is obvious, may be freely turned without affecting the position of the elbow 1 or pipe section 3 or twisting any of the parts. By the use of the springs 15, all play is taken up and the parts properly held in contact.

It is apparent that this connection may be easily and readily assembled or taken apart, while the simplicity of construction greatly simplifies and reduces the cost of manufacture.

What I claim, is:

1. In a swivel pipe connection, the combination with a pipe member, of a pipe section provided with a flange near one end and adapted at said end to fit into the pipe member, a sleeve fitting snugly over the pipe section, an outwardly directed flange at one end of the sleeve adapted to engage the flange of the pipe section, an internal flange at the opposite end of the sleeve having a shoulder adapted to bear against the extreme end of the pipe section, a swivel ring fitting loosely about the sleeve and adapted to engage the outwardly directed flange thereof, and means for connecting and fastening the flange of the pipe section and the swivel ring together.

2. In a swivel pipe connection, the combination with an elbow, of a pipe section having a flange and adapted to fit into the elbow at one end, a sleeve adapted to fit over the pipe section and provided with an internal shouldered flange adapted to bear against the other end of the pipe section, a flange formed on the sleeve, a swivel ring adapted to fit over the sleeve and contact with the last named flange, and means for connecting the swivel ring and the flange of the pipe section to permit the sleeve to turn on the pipe section.

3. In a swivel pipe connection, the combination with an elbow, of a pipe section having a flange and adapted to fit into the elbow at one end, a sleeve adapted to fit over the pipe section and provided with an internal shouldered flange adapted to bear against the other end of the pipe section, a flange formed on the sleeve, a swivel ring adapted to fit over the sleeve in juxta-position to the last named flange, means for connecting the ring and the flange of the pipe section to permit the sleeve to turn on the pipe section, and resilient means interposed between the swivel ring and the flange of the sleeve for holding the parts against play.

In testimony whereof I have signed my name to this specification in the presence of two subscribing witnesses.

GEORGE GUILD.

Witnesses:
    JNO. M. WINFREY,
    M. HEAFER.